US 6,714,567 B2

(12) United States Patent
Masuda

(10) Patent No.: US 6,714,567 B2
(45) Date of Patent: Mar. 30, 2004

(54) LASER LIGHT GENERATING APPARATUS AND OPTICAL APPARATUS USING THE SAME

(75) Inventor: Hisashi Masuda, Tokyo (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 09/955,884

(22) Filed: Sep. 19, 2001

(65) Prior Publication Data

US 2002/0034198 A1 Mar. 21, 2002

(30) Foreign Application Priority Data

Sep. 21, 2000 (JP) ........................................ 2000-287437

(51) Int. Cl.⁷ ........................... H01S 3/10; H01S 3/081; H01S 3/082
(52) U.S. Cl. ............................. 372/21; 372/22; 372/93; 372/97
(58) Field of Search ............................. 372/22, 21, 97, 372/93, 94

(56) References Cited

U.S. PATENT DOCUMENTS 6,526,073 B1 * 2/2003 Spinelli et al. ............... 372/22

* cited by examiner

*Primary Examiner*—Paul Ip
*Assistant Examiner*—Armando Rodriquez
(74) *Attorney, Agent, or Firm*—Jay H. Maioli

(57) ABSTRACT

Provided is a small-sized laser light generating apparatus capable of oscillating continuous light with a range of wavelengths of about 200 nm or less with stability at high conversion efficiency. Light with wavelength $\lambda_1$ and light with wavelength $\lambda_2$ outputted from a first laser light generator and a second laser light generator are introduced into a first resonator and a second resonator, respectively, and then a nonlinear optical device included in both the first and second resonators generates light with wavelength $\lambda_3$ through sum-frequency mixing of these two incoming light beams. The light with the wavelength $\lambda_1$, the light with the wavelength $\lambda_2$ and the light with the wavelength $\lambda_3$, which are spatially separated from one another, enter into and exit from the nonlinear optical device and have different optical paths. The light with the wavelength $\lambda_1$ and the light with the wavelength $\lambda_2$ are set so that the optical axes thereof do not perfectly match in the nonlinear optical device, and an incident angle or an exit angle of at least one of the two light beams is set at a Brewster angle, whereby reflection loss can be further reduced.

26 Claims, 8 Drawing Sheets

# LASER LIGHT GENERATING APPARATUS AND OPTICAL APPARATUS USING THE SAME

BACKGROUND OF THE INVENTION

1. Field of the Invention

The present invention relates to a laser light generating apparatus for functioning as a light source in an optical apparatus such as an ultraviolet microscope and an inspection apparatus for various types of electronic materials and electronic components and so forth. More particularly, the present invention relates to a laser light generating apparatus for generating ultraviolet light with a short wavelength of about 200 nm or less.

2. Description of the Related Art

Laser light has coherence, since the laser light is superior in monochromaticity and directivity because of its single wavelength and phase. Moreover, the laser light can be very finely focused, and thus a tiny area can be irradiated with the laser light. Furthermore, the laser light generally has a higher frequency than a radiowave has, and thus the laser light can have a larger information capacity. Because of the above-mentioned characteristics, the laser light is applied to various fields such as the field of information and communication processing, the field of microfabrication, the field of measurement and the field of medical care.

The performance of an apparatus using the above-mentioned laser light as a light source is generally determined by the wavelength of the laser light and the output stability thereof. Therefore, a laser of a short wavelength has been heretofore developed, but, above all, laser light with wavelengths of about 180 nm to 204 nm has not been obtained yet in the form of continuous light capable of fully satisfying the conditions for practical use, and thus, pulse light alone has been used. It is therefore difficult to use the laser light with wavelengths of about 180 nm to 204 nm in the technical field such as the mastering of an optical disk requiring continuous light or quasi-continuous light such as mode-locked light. When pulse light is used in a semiconductor exposure system or a microstructure inspection apparatus, an optical system, an object to be exposed or inspected or the like may therefore suffer damage due to high peak power of the pulse light.

Continuous light with a wavelength of about 204 nm or more can be obtained with relative ease in the following manner: for example, light with a wavelength of 408 nm or more is entered into a BBO (beta barium borate: $\beta$-$BaB_2O_4$) crystal cut at a phase matching angle so that second harmonic generation (SHG) takes place. However, this method has not so far achieved the generation of continuous light with a wavelength of about 204 nm or less.

On the other hand, reported is a method in which ultraviolet rays with shorter wavelength (about 200 nm or less) undergo continuous wave oscillation by means of the sum frequency of near infrared light and ultraviolet light (about 200 nm to 400 nm). For example, Watanabe et al. has proposed an apparatus in which light with a third wavelength of 194 nm is generated through the entry of both SHG of an argon ion laser and titanium sapphire laser light into a nonlinear optical crystal (M. Watanabe et al., Optics Communications, vol. 97, pp. 225–227 (1993)). In Japanese Patent Application Publication No. Hei 10-341054, proposed is an apparatus in which light with a third wavelength of 193 nm is generated through the sum-frequency mixing of the fourth-order harmonic of a YAG laser and titanium sapphire laser light. These techniques are adapted to improve conversion efficiency by resonating both the two above-mentioned input waves, and a resonator has a structure in which part of an optical path in the resonator is shared by the two input waves.

However, it is very difficult that optical components arranged on the shared optical path are coated so as to satisfy the conditions for low loss of both the respective wavelengths of the input waves. Therefore, the above-mentioned structure has a problem: that is, the finesse of the resonator decreases and thus it is difficult to efficiently perform wavelength conversion. For example, the experimental results obtained by Watanabe et al. are that the factor of multiplication of ultraviolet light by the resonator is limited to about 5 times.

In the latter example, the generated ultraviolet light with the third wavelength is separated from two incoming light beams by a wavelength separating mirror. This mirror also requires high reflectance for two input waves and high transmittance for output waves, but, as in the former case, the mirror is difficult to realize, and thus it is difficult to perform efficient wavelength conversion. In this case, when the intensity of output light is increased, two high-intensity ultraviolet rays overlap each other on a coaxial optical path, and this may result in the destruction of the apparatus. To meet a demand to secure ultraviolet light durability of an optical system in the above-mentioned case of high output, this demand limits a coating material and can thus lead to a decrease in conversion efficiency.

Furthermore, a titanium sapphire laser for use in these techniques has a very wide range of tunable frequencies, and thus, in order to stabilize an absolute wavelength of the laser for the long term, it is necessary to lock the absolute wavelength on a reference resonator or refer to an absorption line of a gas, so that the apparatus becomes complicated.

SUMMARY OF THE INVENTION

The invention is designed to overcome the foregoing problems. It is an object of the invention to provide a laser light generating apparatus which is capable of oscillating continuous light with a range of wavelengths of about 200 nm or less with stability at high conversion efficiency and is capable of size reduction, and an optical apparatus using the same.

In a laser light generating apparatus of the invention, laser light with a first wavelength and laser light with a second wavelength, which are spatially separated from each other, enter into a nonlinear optical device through an incident surface, and the laser light with the first wavelength, the laser light with the second wavelength and laser light with a third wavelength, which are spatially separated from one another, exit from the nonlinear optical device through an exit surface and have different optical paths. When at least either incident angles or exit angles of the laser light with the first wavelength and the laser light with the second wavelength to the nonlinear optical device are set according to the wavelengths thereof, at least either the incident angles or the exit angles are effective. More particularly, when the incident angle or the exit angle of at least one of the laser light with the first wavelength and the laser light with the second wavelength to the nonlinear optical device is equal to a Brewster angle, the incident angle or the exit angle is effective.

In the laser light generating apparatus of the invention, the laser light with the first wavelength and the laser light with the second wavelength enter into the nonlinear optical device at different incident angles, so that entry conditions are determined according to the wavelengths thereof, and therefore losses in first and second resonators are reduced. When the laser light with the first wavelength and the laser light with the second wavelength have the same refraction angle to the nonlinear optical device, their optical axes become parallel to each other in the nonlinear optical device, or, when the laser light with the first wavelength and the laser light with the second wavelength have different refraction angles to the nonlinear optical device, their optical axes do not match in the nonlinear optical device. Therefore, the laser light with the first wavelength and the laser light with the second wavelength do not share an optical path, except when their beams overlap for sum-frequency mixing.

An optical apparatus of the invention comprises the laser light generating apparatus of the invention and is applied to a microscope, various types of analysis and inspection apparatuses, a disk mastering apparatus and so forth.

Other and further objects, features and advantages of the invention will appear more fully from the following description.

DETAILED DESCRIPTION OF THE PREFERRED EMBODIMENTS

Embodiments of the invention will be described in detail below with reference to the drawings.

[First embodiment]

Figure 2:
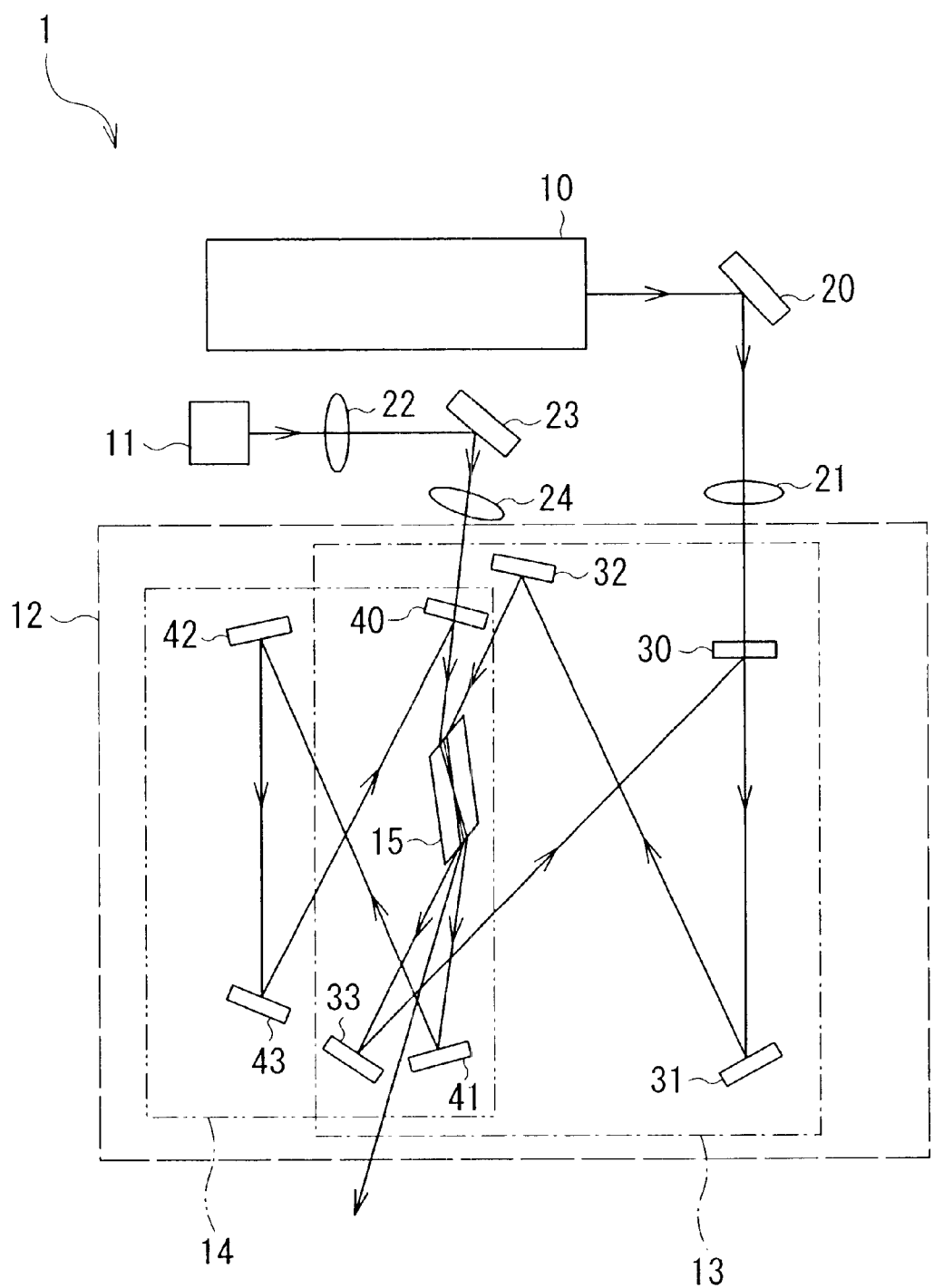
FIG. 2 is a plan view of a configuration of a laser light generating apparatus according to a first embodiment of the invention.

FIG. 2 shows a configuration of a laser light generating apparatus in outline according to a first embodiment of the invention. A laser light generating apparatus 1 according to the embodiment mainly comprises a first laser light generator 10, a second laser light generator 11, and a wavelength converter 12 for performing wavelength conversion on laser light with two different wavelengths outputted from the two laser light generators 10 and 11, and then outputting resultant laser light with a third wavelength.

The first laser light generator 10 is adapted to output continuous ultraviolet light with a wavelength ($\lambda_1$) in a range of, for example, from 250 nm to 275 nm inclusive, and, in the embodiment, the first laser light generator 10 is assumed to perform single-frequency oscillation. The first laser light generator 10 can comprise various types of lasers. For example, a gas laser such as an argon ion laser that has been heretofore used may be used to provide SHG, or a laser obtained through wavelength conversion of an optically pumped semiconductor solid-state laser that has been recently put to practical use may be used. The latter is a solid-state laser apparatus which is pumped with a semiconductor laser, a semiconductor laser array, a semiconductor laser stack, an LD excitation solid-state laser or the like, and the apparatus has higher efficiency and can thus have a simpler cooling device and power supply, as compared to a conventional system which is pumped with an arc lamp. Alternatively, a laser apparatus using a laser crystal such as Nd:YAG, Nd:YVO4, Nd:YLF or Yb:YAG containing a rare earth ion such as Nd or Yb may be used to generate light with a wavelength of from 250 nm to 275 nm inclusive, which is the fourth-order harmonic of the laser. Incidentally, the first laser light generator 10 may be adapted to perform multi-mode oscillation.

The second laser light generator 11 is adapted to output continuous light with a wavelength ($\lambda_2$) in a range of, for example, from 650 nm to 785 nm inclusive, and comprises a semiconductor laser that oscillates at a single frequency. In this case, light of the semiconductor laser may be amplified by a semiconductor amplifier or a solid-state laser amplifier in order to provide higher output. The second laser light generator 11 does not need to comprise a single-frequency laser, and an optically pumped semiconductor solid-state laser, as well as the above-mentioned configuration, may be used as the second laser light generator 11. For example, a titanium sapphire laser, an alexandrite laser, a Cr:LiCAF laser, a Cr:LiSAF laser or the like is used as the second laser light generator 11, or a laser which is pumped with an optically pumped semiconductor solid-state laser may be used when the second laser light generator 11 cannot be directly pumped with a semiconductor. For instance, such lasers include a titanium sapphire laser, an alexandrite laser, a Cr:LiCAF laser, a Cr:LiSAF laser and the like, which are pumped with an optically pumped semiconductor solid-state laser. Therefore, the laser light generating apparatus 1 can comprise a total solid-state laser.

The wavelength converter 12 comprises a first resonator 13 for resonating the light with the wavelength $\lambda_1$ outputted from the first laser light generator 10, a second resonator 14 for resonating the light with the wavelength $\lambda_2$ outputted from the second laser light generator 11, and a nonlinear optical device 15 for generating light with a third wavelength ($\lambda_3$) by internally performing wavelength conversion on the light ($\lambda_1$ and $\lambda_2$ amplified by the two resonators 13 and 14.

In the embodiment, a mirror 20 and an optical device 21, for example, are provided between the first laser light generator 10 and the first resonator 13. The mirror 20 is used as needed, and the number of mirrors 20 may be two or more. The optical device 21 serves to match a mode of the light with the wavelength $\lambda_1$ to a mode of the first resonator 13, and a plurality of optical devices 21 may be used. Specifically, a lens, a mirror, a beam shaping prism or a combination of these optics is used. An optical device 22, a mirror 23 and an optical device 24, for example, are provided between the second laser light generator 11 and the second resonator 14. These optics serve to enter the light with the wavelength $\lambda_2$ into the second resonator 14 with a mode of the light matched to a mode of the second resonator 14.

The first resonator 13 is an external resonator provided in order to resonate the light with the wavelength $\lambda_1$ and comprises an incident mirror 30 and three other mirrors 31, 32 and 33, and the nonlinear optical device 15 is located between the mirrors 32 and 33. Desirably, the incident mirror 30 has reflectance optimized for impedance matching. The above-mentioned first resonator 13 is in a state in which both mode matching and impedance matching hold, and the first resonator 13 resonates when a round of an optical path length (a resonator length) has a given value, or the first resonator 13 becomes resonant every time the optical path length changes by the wavelength $\lambda_1$. However, it is difficult to configure a sufficiently strong resonator, and thus the first resonator 13 does not always keep resonance except when there is little change in temperature. Therefore, it is preferable that a servomechanism for keeping resonance by means of FM sideband method, polarization method or the like be provided, or it is desirable that the servomechanism be used in combination with means for adjusting the resonator length, such as a PZT element, a VCM element or a crystal having an electrooptic effect.

It should be noted that a modulator such as KTP or $LiNbO_3$ for general use has low transmittance and is thus unsuitable for the first wavelength $\lambda_1$, because the light with the first wavelength $\lambda_1$ is deep ultraviolet light with a wavelength of from 250 nm to 275 nm inclusive. Since a BBO crystal or the like that is an electrooptic element having high transmittance at such wavelength has a low electrooptic constant, the BBO crystal or the like must be driven at high voltage whether it is used as a phase modulator or an adjuster for the optical path length. For this reason, polarization method is mainly used as a method of keeping the first resonator 13 resonating.

The second resonator 14 is an external resonator provided in order to resonate the light with the wavelength $\lambda_2$ and comprises an incident mirror 40 and three other mirrors 41, 42 and 43, and the nonlinear optical device 15 is located between the mirrors 40 and 41. In the embodiment, the second resonator 14 has the same configuration as the first resonator 13 has. Desirably, the incident mirror 40 has reflectance of a value for impedance matching, as in the case of the incident mirror 30. Preferably, as in the case of the first resonator, FM sideband method, polarization method or the like is used, or means for adjusting the resonator length, such as PZT, is used.

Furthermore, one nonlinear optical device 15 is located so as to be included in both the two resonators 13 and 14 so that the resonating light with the wavelength $\lambda_1$ and the resonating light with the wavelength $\lambda_2$ may pass through the nonlinear optical device 15. The nonlinear optical device 15 serves to perform sum-frequency mixing, and the nonlinear optical device 15 captures the resonating light with the wavelength $\lambda_1$ and the resonating light with the wavelength $\lambda_2$ and mixes the light with the wavelengths $\lambda_1$ and $\lambda_2$ with each other, thereby generating the light with the third wavelength $\lambda_3$. Thus, the nonlinear optical device 15 not only outputs the light with the third wavelength $\lambda_3$ but also allows the exit of the light with the wavelength $\lambda_1$ and the light with the wavelength $\lambda_2$, which are then reflected by the mirrors 33 and 41, respectively, and thus returned to the mirrors 30 and 42, respectively. For example, the above-mentioned nonlinear optical device 15 is made of a BBO ($\beta$-$BaB_2O_4$) crystal, a CLBO ($CsLiB_6O_{10}$) crystal, an SBBO ($Sr_2Be_2B_2O_7$) crystal or a KBBF ($KBe_2BO_3F_2$) crystal.

Figure 3:
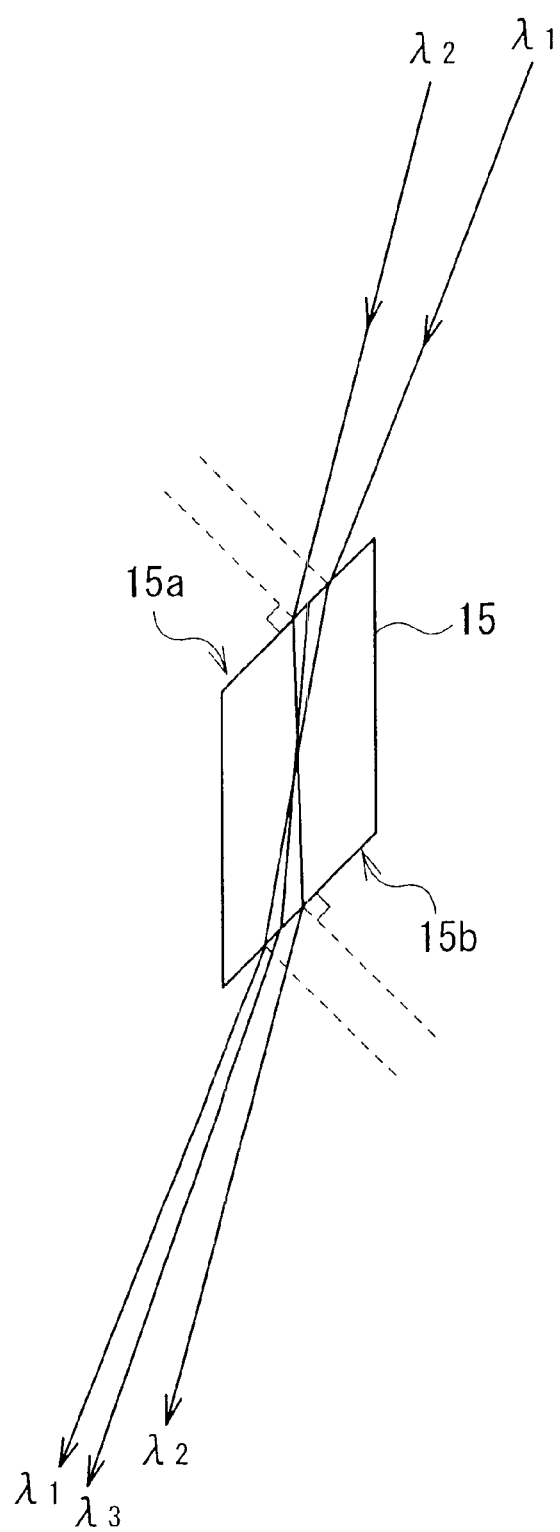
FIG. 3 shows an example of optical paths of laser light in a nonlinear optical device of the laser light generating apparatus shown in FIG. 2.

FIG. 3 shows a state in which the light with the wavelength $\lambda_1$, the light with the wavelength $\lambda_2$ and the light with the wavelength $\lambda_3$ enter into and then exit from the nonlinear optical device 15. In the embodiment, as shown in FIG. 3, the light with the wavelength $\lambda_1$ and the light with the wavelength $\lambda_2$, which are spatially separated from each other, enter into the nonlinear optical device 15 through an incident surface 15a, and then the light with the wavelength $\lambda_1$, the light with the wavelength $\lambda_2$ and the light with the wavelength $\lambda_3$, which are spatially separated from one another, exit from the nonlinear optical device 15 through an exit surface 15b and thus have different optical paths. That is, inside the nonlinear optical device 15, a light beam with the wavelength $\lambda_1$ and a light beam with the wavelength $\lambda_2$ overlap each other because of a demand for sum-frequency mixing, but the light beams do not share an optical axis. The reasons are as follows: that is, when one optical axis is shared by light with different wavelengths, all optical devices on the optical path must satisfy the conditions for loss reduction for all wavelengths passing through the optical devices, so that it is difficult to set the above-mentioned specifications; defects on the surfaces of the optical devices and in the insides thereof or damage to coating materials of the devices, which are/is easily caused by ultraviolet light superimposed on the shared optical axis, are/is avoided; an optical path is distributed to each wavelength so as to prevent loss factors caused on the optical path of one wavelength from inflicting losses upon light with other wavelengths; and so forth.

Spatial separation of the light with the wavelength $\lambda_1$ and the light with the wavelength $\lambda_2$ outside the nonlinear optical device 15 can be accomplished by dispersion or double refraction (the dependence of a refractive index on polarization) by setting at least either an incident angle or an exit angle of each light at 30 degrees or more. In the embodiment, the incident angles of the light with the wavelength $\lambda_1$ and the light with the wavelength $\lambda_2$ on the incident surface 15a are each equal to a Brewster angle $\theta_B$. The Brewster angle refers to an angle at which the reflection of a P-polarized component of S-polarized and P-polarized components of polarized light incident at this angle becomes equal to 0, and the Brewster angle is expressed by the following equation:

$$\theta_B = \tan^{-1}(n)$$

where n denotes a refractive index on the incident surface 15a. The refractive index n takes on varying values according to a wavelength or a state of polarization, and, in the embodiment, the light with the wavelength $\lambda_1$ and the light with the wavelength $\lambda_2$ impinge on the incident surface 15a at the angle $\theta_B$ according to the respective wavelengths of the light. Therefore, both the light with the wavelength $\lambda_1$ and the light with the wavelength $\lambda_2$ are changed into P-polarized light, so that reflection loss in the nonlinear optical device 15 can be reduced.

Incidentally, the incident angles of the light with the wavelength $\lambda_1$ and the light with the wavelength $\lambda_2$ on the incident surface 15a do not have to perfectly match the Brewster angle $\theta_B$, and, for example, an angle close to the angle $\theta_B$, which lies between the angle $\theta_B$ minus about 5 degrees and the angle $\theta_B$ plus about 5 degrees, may be selected. In this case, the reflection loss of P-polarized light is not equal to 0, but the reflection loss can be reduced. An exit angle with the exit surface 15b can be selected in the same manner.

Next, a method of setting the above-mentioned incident angle or exit angle and advantages of the incident angle or exit angle will be described by referring to specific examples.

When setting is made so that transmitted light may have a coaxial optical path within a crystal even in the case where light is allowed to enter and exit at the angle $\theta_B$ or an angle close to the angle $\theta_B$ as described above, neither of the light with the wavelength $\lambda_1$ and the light with the wavelength $\lambda_2$ enters at the angle $\theta_B$ or the angle close to the angle $\theta_B$ due to dispersion. Consequently, reflection loss occurs on a crystal end face although the reflection loss is slight. The reflection loss travels around the resonator and multiplies, thereby increasing resonator loss. For example, when light with a wavelength of 266 nm is entered into a BBO crystal at an incident angle perfectly matched to the angle $\theta_B$ and setting is made so that the light, as well as light with a wavelength of 707 nm entered into the BBO crystal, may have a coaxial optical path within the crystal, the reflection loss of the light with a wavelength of 707 nm becomes equal to 0.185% per surface, and then, when the light with a wavelength of 707 nm is introduced into a standing wave resonator, the loss of the light becomes equal to 0.740% after going and returning. On the contrary, when light with a wavelength of 707 nm is entered into a BBO crystal at an incident angle perfectly matched to the angle $\theta_B$ and setting is made so that the light, as well as light with a wavelength of 266 nm, may have a coaxial optical path within the crystal, the reflection loss of the light with a wavelength of 266 nm becomes equal to 0.48% per surface, and then, when the light with a wavelength of 266 nm is inputted to a ring resonator, the loss of the light becomes equal to 0.96% after traveling around the resonator.

To avoid the occurrence of this type of reflection loss, setting is required so that transmitted light may be spatially separated from each other within a crystal. Discussion is now made with regard to the case where an incident angle is selected from within a range between the respective angles $\theta_B$ of light with a wavelength of 266 nm and light with a wavelength of 707 nm so that both the light may enter at a different angle from the angle $\theta_B$ and thus loss is distributed to each light. The angle $\theta_B$ of the light with a wavelength of 266 nm and the angle $\theta_B$ of the light with a wavelength of 707 nm are equal to 60.4 degrees and 59.0 degrees, respectively, which are different but fairly close, and therefore, even when one incident angle is selected in this manner, the incident angle approximates closely to the angles $\theta_B$. In this case, for example, the reflection loss of the light with a wavelength of 266 nm and the reflection loss of the light with a wavelength of 707 nm can be reduced to 0.3% and 0.1% per surface, respectively, so that the total loss becomes lower than that of the above-mentioned case. Incidentally, a resonator of a conventional sum-frequency generating apparatus having the aforementioned configuration has a multiplication factor of about 5, but a resonator of an apparatus having the above-described configuration can have an improved multiplication factor of about 30 or more, which is equivalent to about 100 or more in terms of finesse.

To further reduce the reflection loss, setting is made so that two beams of transmitted light may be spatially separated from each other, and the beams of light with two wavelengths are entered at the closest possible angle to the corresponding angles $\theta_B$. Only when both beams of light with two wavelengths are entered at the angle $\theta_B$ as in the embodiment, both the reflection losses of P-polarized components of the beams of light become equal to 0, so that the loss becomes minimum.

However, the entry of light at the angle $\theta_B$ is not effective in reducing the loss of S-polarized light, because this entry allows reducing the loss of only a P-polarized component of polarized light. Preferably, the nonlinear optical device 15 is therefore adapted for the type I phase matching, which facilitates changing both of two incoming light beams into P-polarized components. From the viewpoint of the above-mentioned loss, the nonlinear optical device 15 of the embodiment can be regarded as a device for functioning as a type of filter in the two resonators 13 and 14 and thus actively preventing the resonator loss, and the device 15 is adapted to hold or amplify the power of incoming light and thereby eventually contribute to sum-frequency output.

As described above, the light with the wavelength $\lambda_1$ and the light with the wavelength $\lambda_2$ are spatially separated and entered at the angle $\theta_B$, whereby the finesse of at least one of the first resonator 13 and the second resonator 14 can be increased to 100 or more. In general, the finesse in the resonator is given by the following equation (1):

$$F=\pi(R_1R_m)^{1/4}/\{1-(R_1R_m)^{1/2}\} \qquad (1)$$

(where $R_1$ denotes the reflectance of the incident mirror, and $R_m$ denotes the product of the factors of effective utilization of light by the other mirrors and the optical devices in the resonator).

The factor of effective utilization of light refers to the reflectance of the mirror and the transmittance of the optical device. When $R_1$ can be selected for impedance matching, the following equation holds.

$$R_1=R_m=R$$

When R=1, the following equation (2) holds.

$$F=\pi/(1-R) \qquad (2)$$

For example, in the first resonator, it is assumed that the incident mirror 30 is selected so that $R_1$ may be approximately equal to $R_m$ and the loss in the nonlinear optical device 15 is negligible in order that light may enter at the angle $\theta_B$. In this case, according to the equation (2), the reflectance $R_m$ of the other mirrors 31 to 33 can be about 97% or more, and the F value can be 100 or more. It is actually possible to increase the reflectances $R_1$ and $R_m$ to 97% or more, and it is sufficiently feasible to increase the F value to 100 or more even after allowing for absorption and scattering in the nonlinear optical device 15. Furthermore, the reflectance of the incident mirror 30 is increased by increasing the reflectances $R_1$ and $R_m$ to 99% or more, or by reducing the absorption and scattering in the nonlinear optical device 15 to 0.5% or less by using as the nonlinear optical device 15 a high-quality BBO crystal manufactured by means of, for example, pulling using direct method (Czochralski method), whereby the F value can be as high as 300 or more. The same is true of the second resonator.

Figure 1:
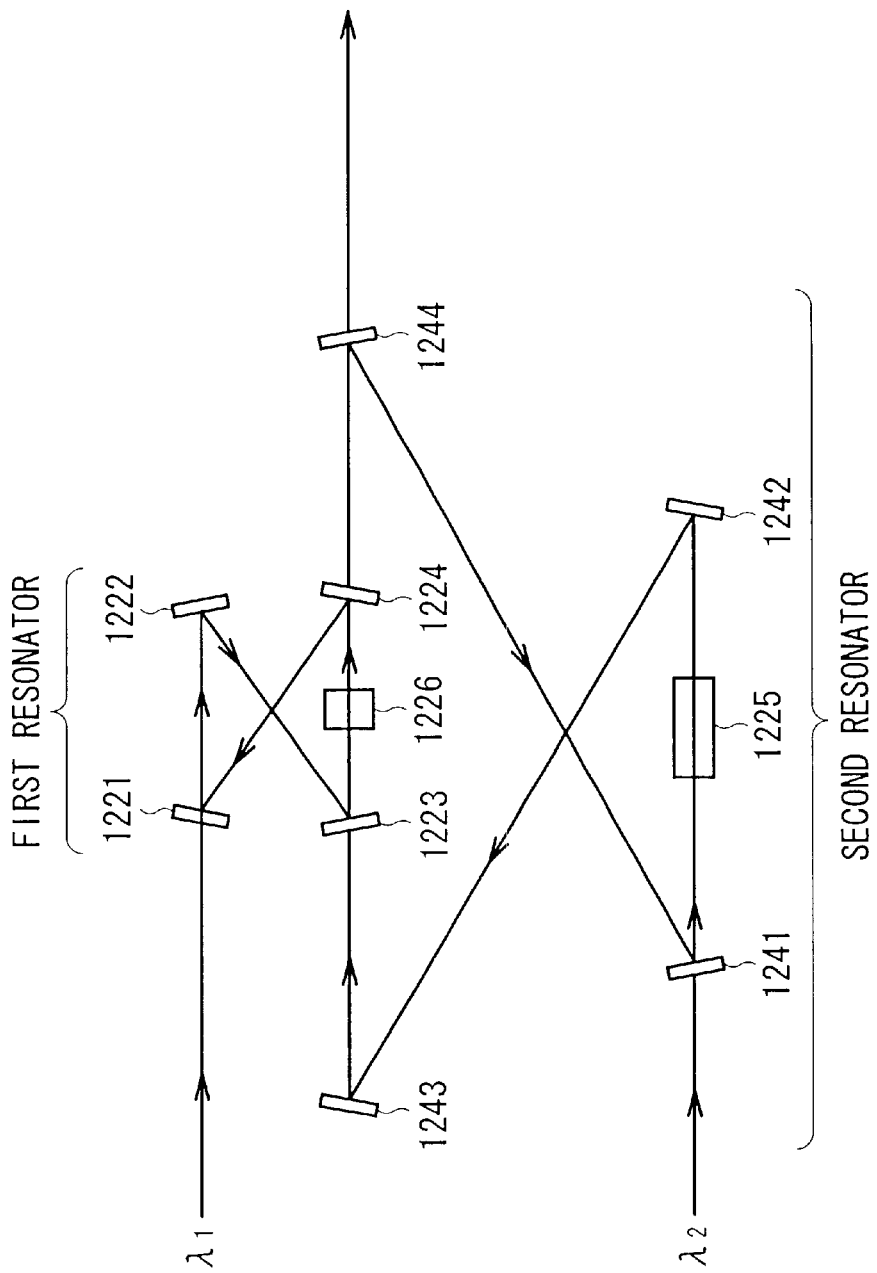
FIG. 1 is an illustration for describing a resonator finesse of a laser light generating apparatus of the related art.

The laser light generating apparatus having the resonator having a finesse of 100 or more as described above can be actually obtained, only when a structural requirement for the embodiment (i.e., the entry of the light with the wavelength $\lambda_1$ and the light with the wavelength $\lambda_2$ into the nonlinear optical device 15 at the angle $\theta_B$ or the angle close to the angle $\theta_B$) is satisfied. For example, in a laser light generating apparatus of the related art described in Japanese Patent Application Publication No. Hei 10-341054, as shown in FIG. 1, an optical path from a mirror 1223 to a mirror 1224 is shared by a first resonator and a second resonator, so that neither of two laser light beams on the optical path enters into a BBO crystal 1226 at the angle $\theta_B$ as described above.

Therefore, reflection loss always occurs on a crystal end face of the BBO crystal 1226. It is possible that the transmittance of the BBO crystal 1226 is technically limited to up to about 95% due to residual reflection even if an antireflection coating is applied to the BBO crystal 1226.

Moreover, in this case, it is necessary to control two conditions, i.e., the reflectance and transmittance of each of the mirrors 1223 and 1224, so that the mirrors 1223 and 1224 may reflect the light with the wavelength $\lambda_1$ and transmit the light with the wavelength $\lambda_2$. In the actual making of the separation mirrors 1223 and 1224, when setting is made so that the mirrors 1223 and 1224 may transmit, for example, 98% or more of the light with the wavelength $\lambda_2$, the upper limit to the reflectance of each mirror for the light with the wavelength $\lambda_1$ is estimated to be about 99%. Even if the reflectance of a remaining mirror 1222 of the first resonator is as high as, for example, about 99.5%, the upper limit to $R_m$ is therefore estimated to be about 92.6% from $R_m=(0.99)^2 \times 0.995 \times 0.95$. When $R_1$ is selected for $R_1=R_m=0.926$, the finesse of the first resonator is estimated to be 13.2 from the equation (2).

To further increase $R_m$ of the first resonator, the following approaches (1) to (3) can be adopted: that is, (1) both end faces of the BBO crystal 1226 are cut at the angle $\theta_B$ so that an incident angle of laser light becomes equal to the angle $\theta_B$; (2) the reflectances of the separation mirrors 1223 and 1224 for the light with the first wavelength are increased; or (3) the reflectance $R_1$ of an incident mirror 1221 is increased. However, the approach (2) causes a decrease in the transmittances of the mirrors 1223 and 1224 for the light with the second wavelength, and the approach (3) causes a significant impairment in the finesse of the second resonator and thus causes a decrease in total efficiency. Even if $R_1$ is maximized to 99% at the expense of the total efficiency, the finesse F of the first resonator is equal to 73.8%, and it is therefore found that the laser light generating apparatus having the above-described structure has substantial difficulty in having the resonator having a finesse of 100 or more.

In the above-mentioned apparatus of the related art by Watanabe et al., a prism instead of the separation mirror is used so as to improve the finesse, but $R_m$ and the finesse are estimated to be about 82% and about 20, respectively, because the reflectance $R_1$ of the incident mirror is equal to 10%. Although the finesse of a low value is partly caused by the quality of the used prism or BBO crystal (manufactured by flux method), the major cause is probably that the performance of an antireflection coating material applied to the BBO crystal is limited due to the design of the material for two wavelengths.

On the other hand, an apparatus by Berkeland et al. uses a BBO crystal cut at the Brewster angle, thereby preventing resonator loss resulting from an antireflection coating (D. J. Berkeland et al., Applied Optics, vol. 36, No. 18, pp. 4159–4162 (1997)). However, in this case, $R_1$ is equal to 91% after allowing for internal absorption caused by the quality of the BBO crystal (manufactured by flux method), and consequently, the finesse remains about 51 ($R_m=97.6\%$). This shows that one condition for improving the finesse is that a high-quality crystal causing little absorption and scattering is used as the nonlinear optical device 15.

[Modification]

When setting is made so that the light with the wavelength $\lambda_1$ and the light with the wavelength $\lambda_2$ may be spatially separated from each other in the nonlinear optical device 15 as in the case of the above-described first embodiment, it is possible that these light beams overlap little and thus sum-frequency conversion efficiency decreases. However, if the resonator loss typified by the above-mentioned reflection loss can be effectively reduced, this allows compensating for a decrease in the conversion efficiency and thus increasing sum-frequency output. Another method of setting the incident angle or exit angle will be now described from the above-mentioned viewpoint.

As described above, there is a need to make setting so that transmitted light may be spatially separated from each other in a crystal for the purpose of reducing the loss. This state is, in actuality, realized by increasing a difference between the incident angles of the light with the wavelength $\lambda_1$ and the light with the wavelength $\lambda_2$ on the incident surface 15a (hereinafter called a separation angle) and thereby making a difference between the respective refraction angles of the light with the wavelength $\lambda_1$ and the light with the wavelength $\lambda_2$. Discussion is now made with regard to the case where a large separation angle is actively formed.

That is, concurrently with keeping two beams of incoming light, i.e., the light with the wavelength $\lambda_1$ and the light with the wavelength $\lambda_2$, capable of sufficiently contributing to sum-frequency generation in the nonlinear optical device 15, optical paths of these incoming light beams are controlled so that the separation angle may become large outside the nonlinear optical device 15. To spatially separate the two incoming light beams, the separation angle $\Delta\theta$ has to be larger than a beam diverging angle $\phi$ (a relative intensity of $1/e^2$ over the overall width) of each incoming light beam ($\Delta\theta>\phi$). Furthermore, to sufficiently separate the light with the wavelength $\lambda_3$ outputted from the nonlinear optical device 15, it is important that $\Delta\theta>2\phi$. Although it should be noted that too large a separation angle $\Delta\theta$ causes a decrease in spatial overlap of the incoming light beams, the separation angle AO does not have little influence on the sum-frequency output when the following equation is satisfied:

$$L\delta\theta<<D$$

(where L denotes a length of the nonlinear optical device 15, $\delta\theta$ denotes an increment of the separation angle in the nonlinear optical device 15, and D denotes an average beam diameter of the incoming light beams in the nonlinear optical device 15).

In this case, the separation angle is formed in a non-critical direction of a phase matching angle (i.e., a direction in which an angle with the c-axis of crystallographic axes of the nonlinear optical device 15 is fixed), whereby a decrease in output due to phase mismatching can be prevented.

An example of a modification will be described below. In the example, the wavelengths of the light beams are set so that the wavelength $\lambda_1$, the wavelength $\lambda_2$ and the wavelength $\lambda_3$ of the generated sum frequency may be equal to 707 nm, 206 nm and 193.3 nm, respectively, and a BBO crystal for performing the type I phase matching is used as the nonlinear optical device 15. Both the incoming rays with the wavelengths $\lambda_1$ and $\lambda_2$ are parallel rays having a diameter of 250 $\mu$m, and are continuous waves that are uniformly outputted. Furthermore, for both the wavelength $\lambda_1$ (707 nm) and the wavelength $\lambda_2$ (206 nm), the reflectance $R_1$ of the incident mirror is equal to 0.99, the reflectance $R_m$ of the resonator excluding the incident mirror and the BBO crystal is equal to 0.99, and the conditions for phase matching are always satisfied in a direction perpendicular to the incident surface 15a. According to the Sellmeier's equation by Kato (Kato, The Review of Laser Engineering, vol. 18, p. 3 (1990)), the refractive indices of the wavelengths $\lambda_1$, $\lambda_2$ and $\lambda_3$ on the incident surface 15a of the nonlinear optical device 15 are equal to 1.6638, 1.7585 and 1.7326, respectively. For the sake of simplicity, the sum-frequency output is proportional to the beam intensity of the incoming light beams with the wavelengths $\lambda_1$ and $\lambda_2$ in the nonlinear optical device 15 and the integral of the spatial overlap of the beams. Also in the example, the spatial overlap of the beams does not mean that the beams share an optical axis.

Figure 4:
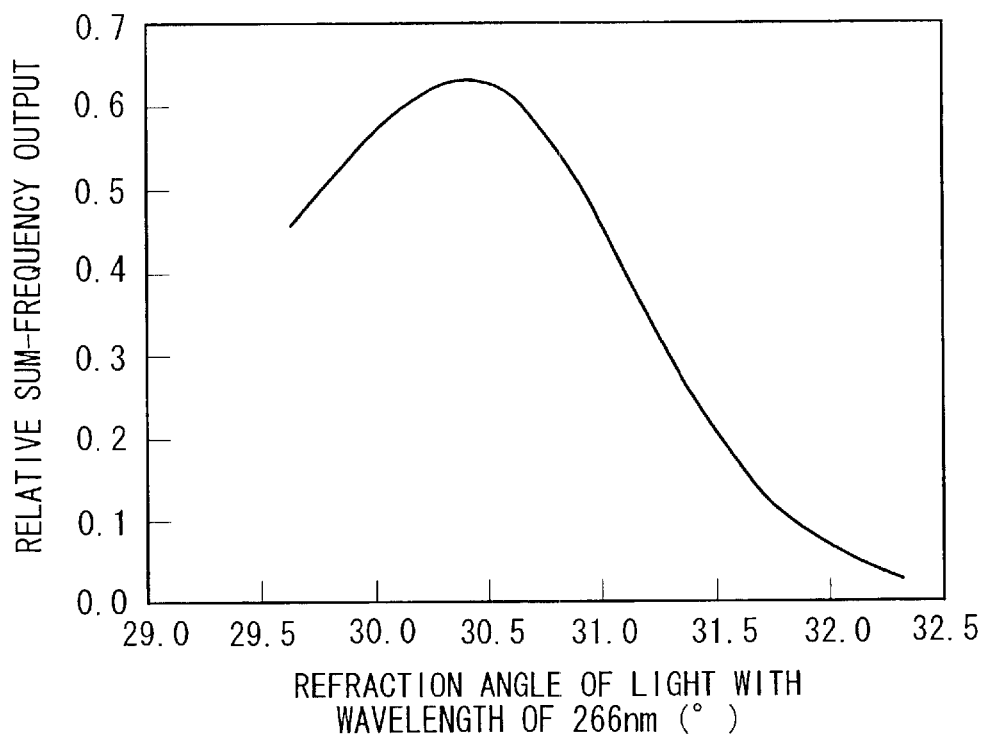
FIG. 4 is a graph of calculated values indicating the dependence of sum-frequency output on a refraction angle of light with a second wavelength to the nonlinear optical device in the laser light generating apparatus shown in FIG. 2.

(i) The incident angle of the light with the wavelength $\lambda_1$ (707 nm) is fixed at 59 degrees that are the angle $\theta_B$, and the refraction angle thereof is fixed at 31 degrees. Then, in this state, the incident angle of the light with the wavelength $\lambda_2$ (206 nm) is varied so that the incident angle is fixed at a position at which the sum-frequency output reaches a maximum. FIG. 4 shows the correlation between the refraction angle of the light with the wavelength $\lambda_2$ (206 nm) and the relative sum-frequency output in this case. As can be seen from FIG. 4, the relative sum-frequency output reaches a maximum when the refraction angle of the light with the wavelength $\lambda_2$ is equal to 30.4 degrees. It is thus found that the sum-frequency output has a maximum value and the separation angle $\Delta\theta$ has an optimum value rather than a simply large value. In this manner, the optical paths of the two incoming light beams can be, therefore, spatially separated and determined with simplicity and ease under the optimum conditions. It is also found that the output reaches a maximum when the optical path is not shared, although the light with the wavelength $\lambda_1$ and the light with the wavelength $\lambda_2$ are coaxial at a refraction angle of 31 degress.

Figure 5:
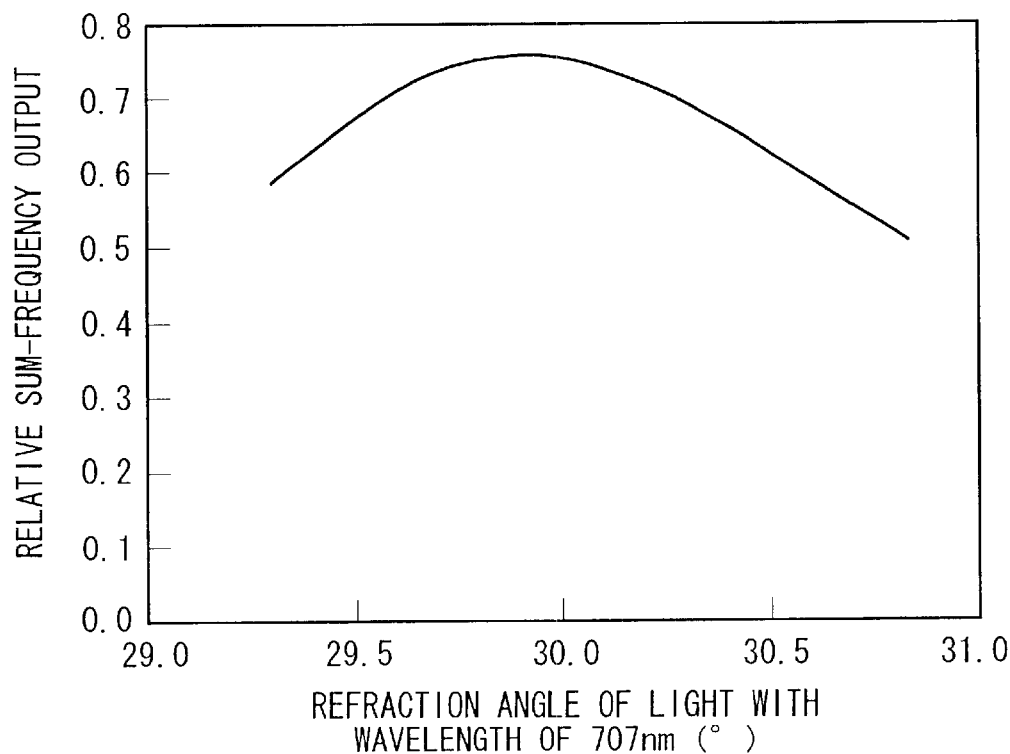
FIG. 5 is a graph of calculated values indicating the dependence of sum-frequency output on a refraction angle of light with a first wavelength to the nonlinear optical device in the laser light generating apparatus shown in FIG. 2.

(ii) The incident angle of the light with the wavelength $\lambda_2$ (206 nm) is fixed at 60.4 degrees that are the angle $\theta_B$, and the refraction angle thereof is fixed at 29.6 degrees. In this state, the incident angle of the light with the wavelength $\lambda_1$ (707 nm) is varied so that the incident angle is fixed at a position at which the sum-frequency output reaches a maximum. FIG. 5 shows the correlation between the refraction angle of the light with the wavelength $\lambda_1$ (707 nm) and the relative sum-frequency output in this case. As can be seen from FIG. 5, the relative sum-frequency output reaches a maximum when the refraction angle of the light with the wavelength $\lambda_1$ is equal to 29.9 degrees, and the relative sum-frequency output is optimized at this position. Also in this case, the output reaches a maximum when the optical path is not shared, although the light with the wavelength $\lambda_1$ and the light with the wavelength $\lambda_2$ are coaxial at a refraction angle of 29.6 degrees.

Although, in these examples, the angle $\theta_B$ is selected as the incident angle to be fixed, the incident angle may be selected from among angles ranging from the angle $\theta_B$ minus about 5 degrees to the angle $\theta_B$ plus about 5 degrees.

Although this method may cause an increase in the resonator loss due to a deviation of the incident angle from the angle $\theta_B$ or cause a decrease in the sum-frequency conversion efficiency due to a decrease in the overlap of two incoming light beams, the spatial separation of the incoming light beams allows eliminating a need to provide a wavelength separating mirror in the resonator, so that the loss in the resonator can be greatly reduced, and therefore the total efficiency can be improved rather than decreases, as described by referring to the example.

For example, the light with the wavelength $\lambda_1$ and the light with the wavelength $\lambda_2$ undergo little dispersion or little double refraction, or the beam diverging angle becomes large, depending on the combination of wavelengths, the combination of polarized light, the type of the nonlinear optical device 15, or the like. In this case, the use of the method of the modification allows inducing an increase in the separation angle, thereby ensuring that the incoming light beams, i.e., the light with the wavelength $\lambda_1$ and the light with the wavelength $\lambda_2$, are spatially separated.

Furthermore, when the separation angle is controlled in this manner so that, for example, the incident angles of the light with the wavelength $\lambda_1$ and the light with the wavelength $\lambda_2$ become larger than the angle $\theta_B$ and thus the separation angle is greatly increased, the distances between the nonlinear optical device 15 and the mirrors 33 and 41 become short, and therefore the laser light generating apparatus 1 can be reduced in size. Incidentally, the above-mentioned apparatus by Berkeland et al. has an insufficient separation angle, and therefore, when the apparatus is designed to minimize the loss or maximize the conversion efficiency, the distances from the nonlinear optical device to the reflecting mirrors become long, so that the apparatus increases in size. Although the apparatus is excellent for, for example, a light source for use in spectroscopic applications in a laboratory, the apparatus is unsuitable for industrial use.

The first embodiment will be described below in conjunction with the modification.

In the laser light generating apparatus 1 in which the optical paths of the light with the wavelength $\lambda_1$ and the light with the wavelength $\lambda_2$ are determined as described above, the apparatus 1 comprises an optical path adjusting mechanism for performing the parallel movement of the nonlinear optical device 15 so as to move the device 15 in the same surface as the incident surface 15*a* so that the mechanism moves and adjusts the optical paths of the light with the wavelength $\lambda_1$ and the light with the wavelength $\lambda_2$, whereby the relative positions of the optical paths can be finely adjusted with simplicity and ease. Preferably, the position of overlap of the light beams with the wavelengths $\lambda_1$ and $\lambda_2$ or the magnitude of overlap is adjusted as described above, because this adjustment allows adjusting or optimizing the output. In this case, when the nonlinear optical device 15 is configured so that the incident surface 15*a* and the exit surface 15*b* are vertically located and thus all optical paths of laser light in the laser light generating apparatus 1 are located in one horizontal surface, the adjustment of the optical paths becomes facilitated.

As shown in FIG. 3, deep ultraviolet light with the wavelength $\lambda_3$ that is a resultant sum frequency exits from the nonlinear optical device 15, passing through between the light with the wavelength $\lambda_1$ and the light with the wavelength $\lambda_2$. Therefore, the light with the wavelength $\lambda_3$ may be allowed to exit by using the nonlinear optical device 15 in combination with only a device having a space separation function equivalent to, for example, an aperture without the use of a wavelength separation device such as a prism, and by using the mirrors 33 and 41 whose sizes or positions are devised. This is an effective outputting method, considering the fact that the transmittance of a wavelength separation film for the wavelength $\lambda_3$ is not very high under the current circumstances.

The laser light generating apparatus 1 having the above-described configuration operates in the following manner, for example.

Firstly, the light with the wavelength $\lambda_1$ is outputted from the first laser light generator 10. The light with the wavelength $\lambda_1$ is inputted to the first resonator 13 of the wavelength converter 12 through the mirror 20 and the optical device 21. The light with the wavelength $\lambda_1$ travels around the first resonator 13, in which the light travels to the mirrors 30, 31 and 32, the nonlinear optical device 15 and the mirror 33 in this sequence and is thus resonated. Moreover, the light with the wavelength $\lambda_2$ is outputted from the second laser light generator 11. The light with the wavelength $\lambda_2$ is inputted to the second resonator 14 of the wavelength converter 12 through the optical device 22, the mirror 23 and the optical device 24. The light with the wavelength $\lambda_2$ travels around the second resonator 14, in which the light travels to the mirror 40, the nonlinear optical device 15 and the mirrors 41, 42 and 43 in this sequence and is thus resonated. Thus, the nonlinear optical device 15 generates a sum frequency of the wavelength $\lambda_3$ composed of the light with the wavelength $\lambda_1$ and the light with the wavelength $\lambda_2$, and then the light with the wavelength $\lambda_3$ is outputted from the wavelength converter 12 after passing through right between the mirrors 33 and 41.

A wavelength width of sum-frequency output is variously set according to a request for, for example, speckle reduction, lens chromatic aberration or an interferometer coherence length, while the wavelength width can be classified in stages according to the respective line widths or bandwidths of the first laser light generator and the second laser light generator. That is, a wavelength width of output light can be 10 pm or less when simple band limits are imposed on a solid-state laser, the wavelength width can be 1 pm or less when a solid-state or semiconductor laser has a narrow band equivalent to a bandwidth of a gas laser, or the wavelength width can be 0.1 pm or less when laser light has a single frequency.

As described above, in the laser light generating apparatus 1 of the embodiment, the light with the wavelength $\lambda_1$ and the light with the wavelength $\lambda_2$, which are spatially separated from each other, enter into the nonlinear optical device 15 through the incident surface 15a, and then the light with the wavelength $\lambda_1$, the light with the wavelength $\lambda_2$ and the light with the wavelength $\lambda_3$, which are spatially separated from one another, exit from the nonlinear optical device 15 through the exit surface 15b and thus have different optical paths. Therefore, the occurrence of optical loss that occurs in a conventional resonator is prevented in the first resonator 13 and the second resonator 14, and thus a reduction in loss results in high resonator finesse, so that the conversion efficiency in sum-frequency mixing improves. More particularly, output light beams are already spatially separated before reaching the exit surface 15b, and therefore there is no need to provide a wavelength separating mirror in the wavelength converter 12, so that the loss can be greatly reduced.

Moreover, the first resonator 13 and the second resonator 14 do not share an optical path in the resonators 13 and 14, and therefore, even if damage occurs in one resonator, no loss occurs in the other resonator. Even if a loss occurs in the resonator 13 or 14, an increase in the resonator loss is prevented as a whole, and therefore the resonator can be operated for a long time with higher stability. There is no need for a coating that is applied to the device 15 of a conventional resonator so as to satisfy the conditions for loss reduction for all transmitted light, and therefore the optical loss due to this coating can be eliminated, so that the apparatus can be configured with simplicity and ease and cost reduction can be also achieved.

Furthermore, the incident angles of the light with the wavelength $\lambda_1$ and the light with the wavelength $\lambda_2$ on the incident surface 15a are set at the Brewster angle $\theta_B$ according to the respective wavelengths, and therefore the reflection loss in the nonlinear optical device 15 can be reduced.

Furthermore, the first laser light generator 10 and the second laser light generator 11 are adapted to generate continuous ultraviolet light, and therefore the laser light generating apparatus 1 can generate illuminating light that is more advantageous in speckle elimination than pulse light, so that the apparatus 1 can be applied to, for example, a microscope or an inspection apparatus for a semiconductor or the like, to serve as an apparatus which causes less damage to an object to be inspected.

The laser light generating apparatus 1 including the first laser light generator 10 and the second laser light generator 11 comprises a total solid-state laser apparatus, and therefore there is no need for piping for external cooling water and a large-capacity power supply that are required for, for instance, a gas laser apparatus, so that the apparatus can be reduced in scale. Moreover, the total solid-state laser apparatus facilitates obtaining good wavelength characteristics with stability, even if high output is implemented. The second laser light generator 11 comprises a semiconductor laser that oscillates at a single frequency, and therefore the generator 11 can easily stabilize an absolute wavelength with uniform accuracy.

[Second embodiment]

Figure 6:
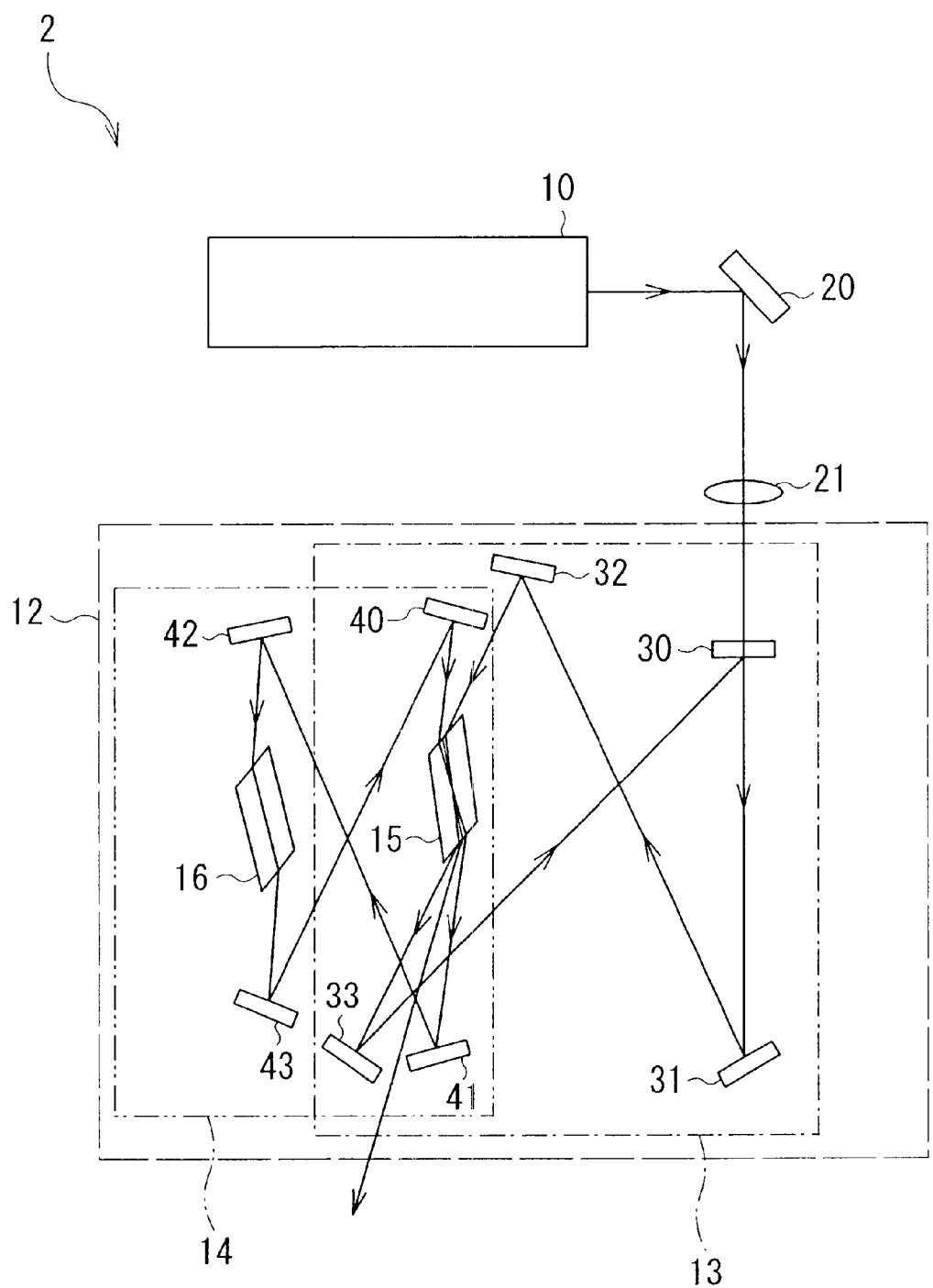
FIG. 6 is a plan view of a configuration of a laser light generating apparatus according to a second embodiment of the invention.

FIG. 6 shows a general configuration of a laser light generating apparatus according to a second embodiment of the invention. A laser light generating apparatus 2 according to the second embodiment is different from the laser light generating apparatus 1 according to the first embodiment, in that a second laser light generator 16 is provided in the second resonator 14 and, for example, means (not shown) for pumping the second laser light generator 16 through the output of light, a current or the like is connected to the second laser light generator 16. The second resonator 14 is an external resonator of the second laser light generator 11 in the first embodiment, but, in the second embodiment, a laser medium, i.e., the second laser light generator 16, is incorporated in the second resonator 14, and therefore the second laser light generator 16 is integral with the second resonator 14. In the second embodiment, the same components as the components of the first embodiment are indicated by the same reference numerals, and the description of the same components is omitted.

The second laser light generator 16 is located between the mirrors 42 and 43 in the second resonator 14, and is adapted to output continuous ultraviolet light with a wavelength ($\lambda_2$) in a range of, for example, from 650 nm to 785 nm inclusive in the same manner as the second laser light generator 11. A material of the second laser light generator 16 is the same as that of the second laser light generator 11, and, for example, a semiconductor laser, a solid-state laser such as titanium sapphire, alexandrite, Cr:LiCAF or Cr:LiSAF, or the like can be used. The second laser light generator 16 is adapted to simultaneously output light and amplify the output light through the second resonator 14.

The above-described laser light generating apparatus 2 outputs a sum frequency in the same manner as the laser light generating apparatus 1. At this time, the light with the wavelength $\lambda_2$ travels around the second resonator 14 along an optical path comprising the mirrors 40 to 43 and the second laser light generator 16, and thus the second resonator 14 obtains gain that is higher than gain obtained through only resonance.

According to the second embodiment, the light with the wavelength $\lambda_2$ is amplified by the second laser light generator 16 itself so that the high-output light may enter into the nonlinear optical device 15, and therefore the sum-frequency output can be increased. The second embodiment can obtain the same advantages as the first embodiment obtains.

[Third embodiment]

Figure 7:
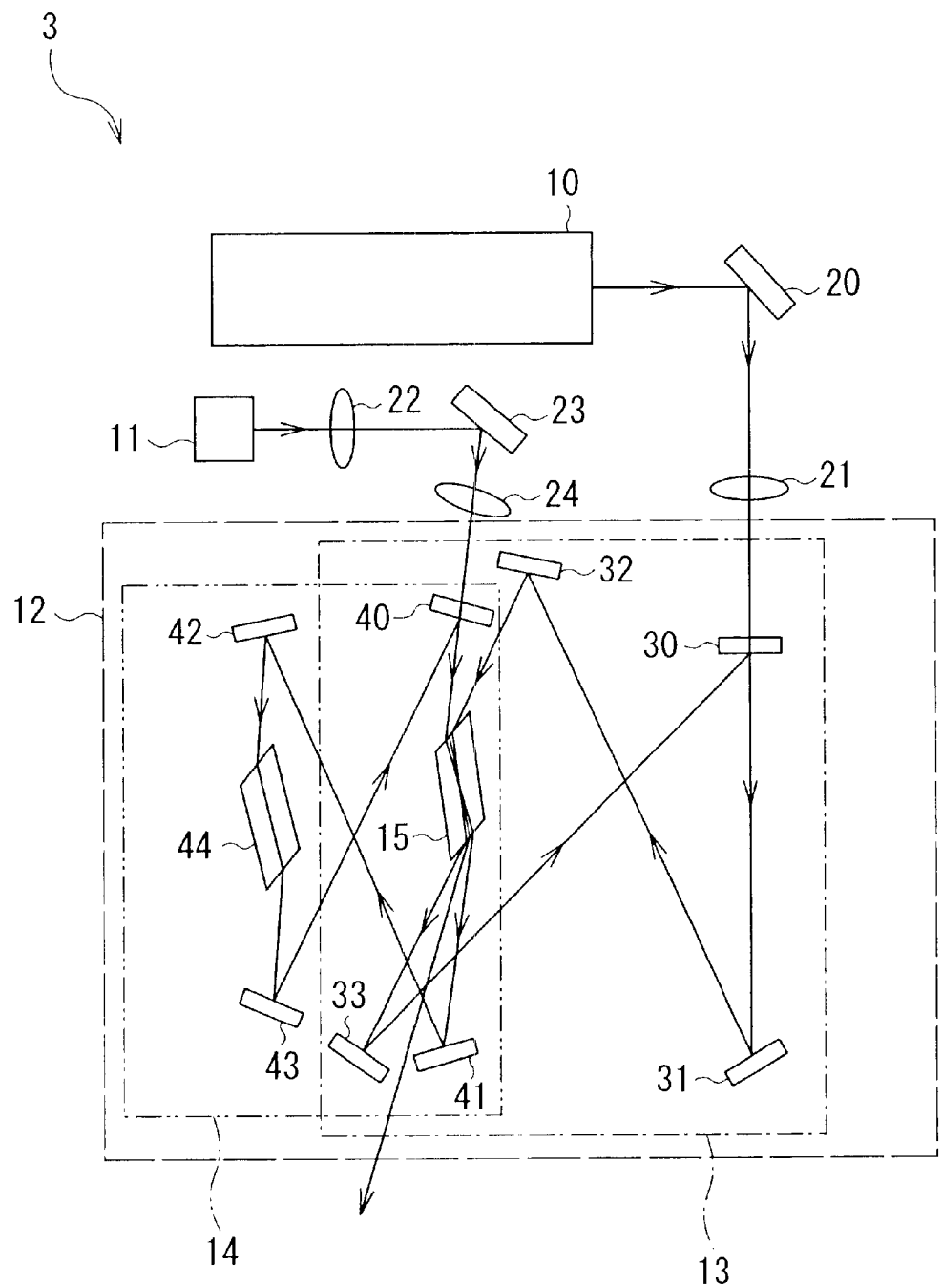
FIG. 7 is a plan view of a configuration of a laser light generating apparatus according to a third embodiment of the invention.

FIG. 7 shows a general configuration of a laser light generating apparatus according to a third embodiment of the invention. A laser light generating apparatus 3 according to the third embodiment is different from the laser light generating apparatus 1 according to the first embodiment, in that a laser gain medium 44 for functioning as an amplifier is additionally provided in the second resonator 14. This is one amplification method, which is called injection locking. In the third embodiment, the same components as the components of the first embodiment are indicated by the same reference numerals, and the description of the same components is omitted.

The laser gain medium 44 is located between the mirrors 42 and 43 in the second resonator 14 and is adapted to actively increase the gain of the resonator 14 upon receipt of input from a master laser (not shown). A low-output semiconductor laser or solid-state laser can be used as the master laser, and a semiconductor amplifier, a solid-state gain medium such as a titanium sapphire crystal, an alexandrite crystal, a Cr:LiCAF crystal or a Cr:LiSAF crystal, or the like, for example, can be used as the laser gain medium 44. When the solid-state gain medium is used, it is desirable for size reduction and efficiency improvement that the laser gain medium 44 be adapted to be pumped with a semiconductor laser or an LD excitation solid-state laser.

The above-described laser light generating apparatus 3 outputs a sum frequency in the same manner as the laser light generating apparatus 1. At this time, the light with the wavelength $\lambda_2$ travels around the second resonator 14 along an optical path comprising the mirrors 40 to 43 and the laser gain medium 44, and thus the second resonator 14 obtains gain that is higher than gain obtained through only resonance.

According to the third embodiment, the light with the wavelength $\lambda_2$ is amplified by the laser gain medium 44 so that the high-output light may enter into the nonlinear optical device 15, and therefore the sum-frequency output can be increased. The third embodiment can obtain the same advantages as the first embodiment obtains.

[Fourth embodiment]

Figure 8:
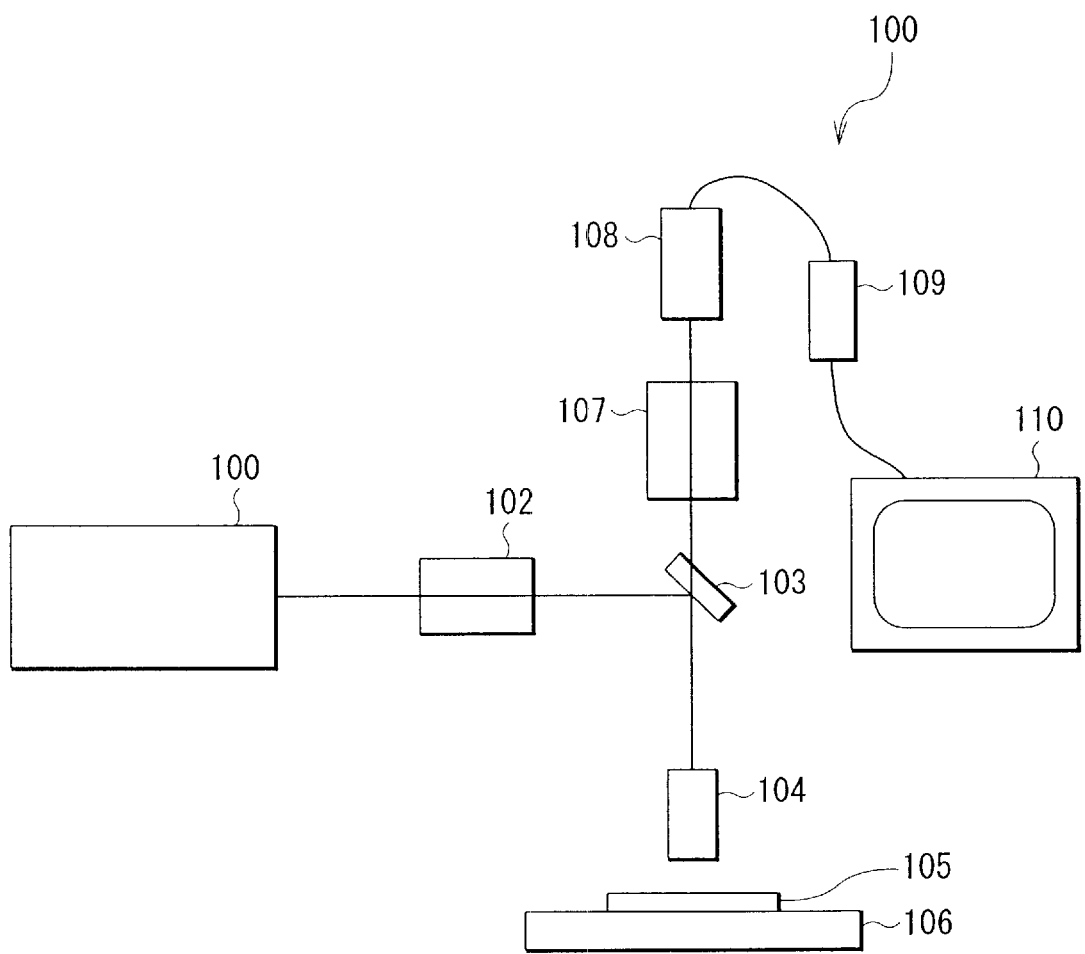
FIG. 8 shows a configuration of an ultraviolet microscope according to a fourth embodiment of the invention.

FIG. 8 shows a general configuration of an ultraviolet microscope according to a fourth embodiment of the invention. An ultraviolet microscope 100 according to the fourth embodiment comprises a laser light generating apparatus 101, an optical system 102, a beam splitter 103, an objective lens 104, a stage 106 on which an object 105 to be inspected is to be placed, an image-forming optical system 107, an image capturer 108, an image converter 109 and an image display 110. In the fourth embodiment, the laser light generating apparatus 101 is the laser light generating apparatus of the invention and comprises the laser light generating apparatus according to any one of the above-described first, second and third embodiments, for example. The optical system 102 has facilities for beam shaping, speckle reduction, uniform-beam formation, beam deflection, polarization control, light-quantity adjustment, aperture stop and so forth and includes optical devices such as a lens, a mirror and a prism. A polarization beam splitter may be used as the beam splitter 103, and, in this case, a quarter-wave plate may be interposed between the beam splitter 103 and the objective lens 104. Objects 105 to be inspected include, for example, a semiconductor substrate, a semiconductor integrated circuit, an optical device, a liquid crystal substrate, a liquid crystal function device, a disk head, a biological material, an object having a microstructure that reflects and scatters some of ultraviolet rays, and the like.

The image capturer 108 serves to obtain image information obtained from the image-forming optical system 107 in the form of an optical signal, to convert the obtained image information into an analog signal and to output the analog signal. For example, the image capturer 108 comprises a CCD pickup device having a photodiode array and a CCD (a charge coupled device) connected to the photodiode array, an image pickup tube, or the like. The image converter 109 serves to convert the analog signal inputted from the image capturer 108 into a digital signal and to output the digital signal and comprises an A/D converter or the like. The image display 110 serves to reproduce and display an image from the digital signal inputted from the image converter 109 and can comprise various types of displays. The ultraviolet microscope 100 is adjunctively provided with a carrier apparatus for carrying the object to be inspected, a shield, an auto-focus apparatus, an anti-vibration apparatus, and the like (not shown).

The above-described ultraviolet microscope 100 operates in the following manner. That is, the laser light generating apparatus 101 outputs ultraviolet light, and the optical system 102 makes the light uniform in space, shapes the light, makes the light uniform in time and adjusts the light quantity. Then, the light enters into the beam splitter 103, part of the light enters into the objective lens 104, and the object 105 to be inspected, which is placed on the stage 106, is irradiated with the light.

Then, the light exits from the object 105 to be inspected, passes through the objective lens 104 and reaches the beam splitter 103, and the light further passes through the image-forming optical system 107, which then projects the light to the image capturer 108. In the image capturer 108, an auto-focus mechanism (not shown) varies a distance between the objective lens 104 and the object 105 to be inspected, thereby making adjustments so that an image to be obtained by the image capturer 108 may be formed into a conjugate image into which the object 105 to be inspected is magnified. Various types of methods, such as a method using variations in image resolving power, a method in which an object to be inspected is irradiated with light from another light source and beams of light are brought to a focal point, a method in which variations in capacitance in a space between a sensor and an object to be inspected are detected, can be used as an auto-focus method.

Furthermore, the image capturer 108 obtains the light projected from the image-forming optical system 107 in the form of a signal, converts the obtained signal into an analog signal and outputs the analog signal to the image converter 109. The image converter 109 performs A/D conversion on the signal and also performs image magnification or reduction, addition of user functions, format conversion for storing data, and the like, and then the image converter 109 sends the digitized signal to the image display 110. Finally, the image display 110 reproduces and displays an image from the digital signal inputted from the image converter 109.

According to the above-described ultraviolet microscope 100, the laser light generating apparatus of the invention is used as the laser light generating apparatus 101 that is a light source so as to output a continuous wave of about 200 nm or less, and therefore the apparatus can obtain and analyze an image at higher resolution as compared to a conventional continuous-wave light source. Moreover, the output of the ultraviolet microscope 100 is a continuous wave, and therefore the apparatus not only can reduce speckle but also can prevent damage to the optical system or the object to be inspected as compared to a pulse light source of an equivalent wavelength. Accordingly, non-destructive inspection becomes possible even in the fields in which non-destructive inspection has been heretofore impossible in a method of measuring at high resolving power, typified by, for example, fluorescent substances such as a semiconductor wafer, a semiconductor pattern, a liquid crystal pattern, a reticle and a biological material, and the like, and therefore the range of objects to be inspected can become wider. Furthermore, the laser light generating apparatus of the invention is used as the laser light generating apparatus 101, and therefore no vacuum is required, so that throughput can be improved.

The image converter 109 and the image display 110 can include a computer such as a personal computer, and an application program for image analysis, image data analysis or the like can be installed in the image converter 109 or the image display 110. The ultraviolet microscope 100 can be adjunctively equipped with a data input/output device, a user interface, a specific filter or the like, as necessary. As described above, the ultraviolet microscope 100 can be additionally provided with various types of functions including image processing.

Moreover, the ultraviolet microscope 100 can constitute not only the ultraviolet microscope but also various types of inspection apparatuses such as a semiconductor inspection apparatus, a mask inspection apparatus, a liquid crystal inspection apparatus and a disk head inspection apparatus. For example, the ultraviolet microscope 100 is additionally provided with a wafer carrier mechanism, a data input/output device, a data storage, a program for classifying defects, a statistical software package and the like, whereby the ultraviolet microscope 100 can be used as a semiconductor inspection apparatus for inspecting a semiconductor wafer or a semiconductor integrated circuit. When the object 105 to be inspected is a mask or a reticle, the ultraviolet microscope 100 can be used as a mask inspection apparatus, or the ultraviolet microscope 100 can constitute a disk head inspection apparatus capable of inspecting a microstructure such as a hard disk substrate or a head gap. Furthermore, when the ultraviolet microscope 100 utilizes absorption properties of ultraviolet rays, the ultraviolet microscope 100 allows the observation of a structure that transmits visible light and cannot be thus generally seen, and therefore the ultraviolet microscope 100 can check defects or a structure of a liquid crystal or the like, for instance. Any inspection apparatus can reduce noise due to damage to the object to be inspected, speckle or the like and can therefore perform inspection at high resolving power.

Even a substance, which absorbs little light in the range of wavelengths that has been heretofore used in a microscope, often absorbs wavelengths of 200 nm or less. Therefore, the ultraviolet microscope 100 is adapted to detect fluorescence when energy stored in the substance through this absorption is again released as the fluorescence generated from a defect, an impurity, an intentionally added marker or the like, whereby the ultraviolet microscope 100 can be used as a fluorescence microscope for inspecting the purity of a substance, the type, concentration and active state of an impurity, or the like.

[Fifth embodiment]

Figure 9:
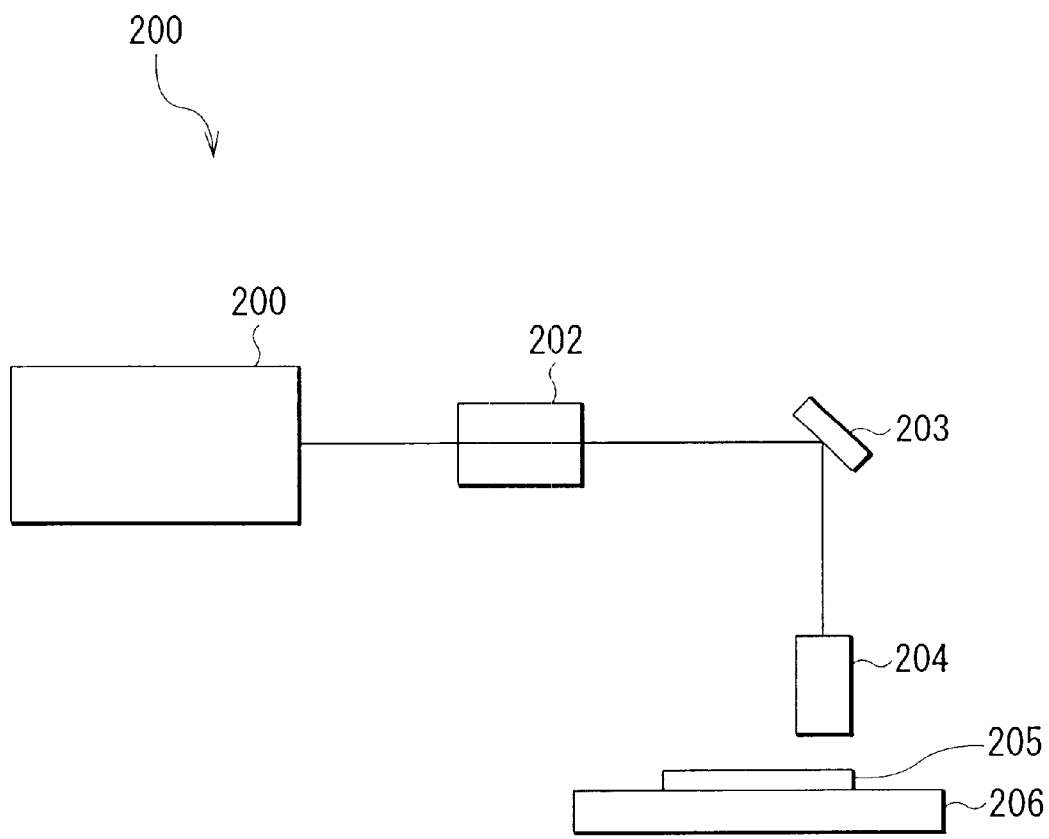
FIG. 9 shows a configuration of a disk mastering apparatus according to a fifth embodiment of the invention.

FIG. 9 shows a general configuration of a disk mastering apparatus 200 according to a fifth embodiment of the invention. The disk mastering apparatus 200 comprises a laser light generating apparatus 201, an optical system 202, a mirror 203, an objective lens 204, a, master disk 205 and a stage 206. In the fifth embodiment, the laser light generating apparatus 201 is the laser light generating apparatus of the invention and comprises the laser light generating apparatus according to any one of the above-described first, second and third embodiments, for example. The optical system 202 has facilities such as a beam shaper, a light-quantity adjuster, a multi-beam generator, a modulator, a beam deflector, a polarization controller and an aperture stop and includes optical devices such as a lens, a mirror and a prism. The mirror 203 serves to orient the direction of travel of laser light from the laser light generating apparatus 201 in the direction of the stage 206, and the mirror 203 may comprise a beam splitter. The stage 206 serves to place the master disk 205 thereon and has functions of rotation and translation. The disk mastering apparatus 200 is adjunctively provided with a data reproducing apparatus, a format encoder, a stage controller, an anti-vibration apparatus, and the like (not shown).

In the disk mastering apparatus 200, laser light outputted from the laser light generating apparatus 201 passes through the optical system 202, the mirror 203 and the objective lens 204, then the master disk 205 on the stage 206 is irradiated with the laser light, and thus a spot is formed at a desired position on a surface of the master disk 205. A diameter d of the spot formed on the master disk 205 is substantially given by the following equation:

$$d=1.22\lambda/NA$$

(where $\lambda$ denotes a wavelength of the laser light, and NA denotes a numerical aperture).

Thus, the use of a lens having the same numerical aperture allows forming a spot which is about 30% smaller than a spot formed by use of a laser of 266 nm that is a wavelength of a continuous wave laser that has been heretofore available. Therefore, about a twofold improvement in a recording density can be theoretically expected.

As described above, according to the disk mastering apparatus 200, the laser light generating apparatus of the invention is used as the laser light generating apparatus 201 that is a light source so as to output a continuous wave with a wavelength of about 200 nm or less, and it is therefore possible to form a spot which is 20% or more smaller than a spot that has been heretofore formed. Therefore, a master disk having a high recording density can be manufactured.

Although the invention has been described above by referring to the embodiments, the invention is not limited to the above-described embodiments and various modifications of the invention are possible. For example, in the above-described first embodiment, the first resonator 13 comprises the mirrors 30 to 33 as shown in FIG. 2, but the structure of the resonator 13 is not limited to the first embodiment but can be appropriately changed. That is, the number of mirrors is not necessarily limited to four. For example, a device other than a mirror, such as a prism, may be used, and therefore, such an optical device may be used so that the number of mirrors is one to three or is four or more. In the first embodiment, the light with the wavelength $\lambda_1$ enters through the mirror 30 and into the first resonator 13, but the mirror 32 may be used as an incident mirror so that the light enters through the mirror 32 and into the first resonator 13. As in the case of the first resonator 13, the configuration of the second resonator 14 can be appropriately changed, and another mirror, e.g., the mirror 42, rather than the mirror 40, may be used as an incident mirror. Since the configurations of the resonators of the second and third embodiments are the same as the configuration of the resonator of the first embodiment, the configurations thereof can be changed in the same manner.

As described above, according to the laser light generating apparatus of the invention, the laser light with the first wavelength and the laser light with the second wavelength, which are spatially separated from each other, enter into the nonlinear optical device through the incident surface, and the laser light with the first wavelength, the laser light with the second wavelength and the laser light with the third wavelength, which are spatially separated from one another, exit from the nonlinear optical device through the exit surface and have different optical paths. Therefore, the optical loss can be greatly reduced, so that the wavelength conversion efficiency in sum-frequency mixing or the output of the laser light with the third wavelength that is a sum frequency can be improved.

Moreover, three beams of laser light have different optical paths, and thus the first resonator and the second resonator are configured so as not to share an optical path in the resonators. Thus, even if damage occurs in one resonator, no loss occurs in the other resonator, and therefore an increase in the resonator loss is prevented as a whole, so that the resonator can be operated for a long time with higher stability. Moreover, a coating for a plurality of wavelengths becomes unnecessary for the optical device in the resonator, and therefore the optical loss due to this coating can be eliminated, so that the apparatus can be configured with simplicity and ease and cost reduction can be also achieved.

According to the laser light generating apparatus of one aspect of the invention, at least one of the incident angle and the exit angle of the laser light with the first wavelength or the laser light with the second wavelength to the nonlinear optical device is equal to the Brewster angle according to the wavelength, and therefore the reflection loss in the nonlinear optical device can be reduced.

According to the laser light generating apparatus of another aspect of the invention, the laser light generating apparatus comprises a solid-state laser apparatus, and therefore deep ultraviolet light, which is continuously emitted in the range of wavelengths of about 200 nm or less, can be obtained with high reliability and stability at high energy efficiency by use of a small-sized apparatus.

According to the optical apparatus of the invention, the optical apparatus comprises the laser light generating apparatus of the invention, and therefore the optical apparatus having high energy efficiency and high operation stability, which uses as a light source deep ultraviolet light that is continuously emitted in the range of wavelengths of about 200 nm or less, can be achieved.

Obviously many modifications and variations of the present invention are possible in the light of the above teachings. It is therefore to be understood that within the scope of the appended claims the invention may be practiced otherwise than as specifically described.

What is claimed is:

1. A laser light generating apparatus comprising:

a first laser light generator for outputting laser light with a first wavelength;

a first resonator for resonating the laser light with the first wavelength;

a second laser light generator for outputting laser light with a second wavelength;

a second resonator arranged adjacent said first resonator for resonating the laser light with the second wavelength;

a nonlinear optical device included in the first resonator and the second resonator and having an incident surface and an exit surface at respective ends through which the laser light with the first wavelength and the laser light with the second wavelength enter and exit; and wherein the laser light generating apparatus generates laser light with a third wavelength through sum-frequency mixing of the laser light with the first wavelength and the laser light with the second wavelength being in a crossing relationship when passing through the nonlinear optical device;

optical elements respectively arranged in the first and second resonators for setting a respective incidence of the laser light with the first wavelength and the laser light with the second wavelength relative to the incident surface of the nonlinear optical device, so that the laser light with the first wavelength and the laser light with the second wavelength do not share an optical axis inside the nonlinear optical device, whereby the laser light with the first wavelength and the laser light with the second wavelength have spatially separated beam central axes and enter into the nonlinear optical device through the incident surface; and the laser light with the first wavelength, the laser light with the second wavelength, and the laser light with the third wavelength have spatially separated beam central axes, exit from the nonlinear optical device through the exit surface, and have different optical paths.

2. The laser light generating apparatus according to claim 1, wherein one of an incident angle and an exit angle of light with respect to the nonlinear optical device is one of equal to and more than 30 degrees.

3. The laser light generating apparatus according to claim 2, wherein one of the incident angle and the exit angle of light with respect to the nonlinear optical device is one of equal to and close to a Brewster angle.

4. The laser light generating apparatus according to claim 1, wherein one of incident angles and exit angles of the laser light with the first wavelength and the laser light with the second wavelength with respect to the nonlinear optical device are set by the optical elements according to the first wavelength and the second wavelength.

5. The laser light generating apparatus according to claim 4, wherein one of the incident angle and the exit angle of the laser light with the first wavelength and the laser light with the second wavelength with respect to the nonlinear optical device is equal to a Brewster angle according to the first wavelength and the second wavelength.

6. The laser light generating apparatus according to claim 1, wherein the optical elements are arranged so that one of an incident angle and an exit angle of one of the laser light with the first wavelength and the laser light with the second wavelength with respect to the nonlinear optical device is fixed, and the incident angle and the exit angle of the other of the laser light with the first wavelength and the laser light with the second wavelength with respect to the nonlinear optical device is varied so that one of the entry angle and the exit angle is set at an angle at which an output of the laser light with the third wavelength reaches a maximum value.

7. The laser light generating apparatus according to claim 1, wherein the nonlinear optical device performs type I phase matching.

8. The laser light generating apparatus according to claim 1, wherein the nonlinear optical device is made of one of a BBO ($\beta$-BaB$_2$O$_4$) crystal, a CLBO (CsLiB$_6$O$_{10}$) crystal, an SBBO (Sr$_2$Be$_2$B$_2$O$_7$) crystal and a KBBF (KBe$_2$BO$_3$F$_2$) crystal.

9. The laser light generating apparatus according to claim 8, wherein the nonlinear optical device is made of a BBO ($\beta$-BaB$_2$O$_4$) crystal manufactured by a direct pulling method.

10. The laser light generating apparatus according to claim 1, wherein a resonator finesse of one of the first resonator and the second resonator is equal to or more than 100.

11. The laser light generating apparatus according to claim 6 wherein the resonator finesse of one of the first resonator and the second resonator is equal to or more than 300.

12. The laser light generating apparatus according to claim 1, wherein the first resonator is an external resonator and the second resonator is one of a laser amplifier and an external resonator.

13. The laser light generating apparatus according to claim 1, wherein the second laser light generator is one of a semiconductor laser and an LD excitation solid-state laser.

14. The laser light generating apparatus according to claim 13, wherein the second laser light generator one of oscillates and resonates at a single frequency.

15. The laser light generating apparatus according to claim 13 wherein the second laser light generator is one of a titanium sapphire laser, an alexandrite laser, a Cr:LiCAF laser and a Cr:LiSAF laser.

16. The laser light generating apparatus according to claim 1, wherein the second resonator is one of a semiconductor amplifier and a solid-state laser amplifier.

17. The laser light generating apparatus according to claim 16, wherein the second resonator amplifies the laser light with the second wavelength by injection locking using the semiconductor-amplified laser as a master laser.

18. The laser light generating apparatus according to claim 16, wherein the solid-state laser amplifier is made of one of a titanium sapphire crystal, an alexandrite crystal, a Cr:LiCAF crystal and a Cr:LiSAF crystal.

19. The laser light generating apparatus according to claim 16, wherein the solid-state laser amplifier is pumped with one of a semiconductor laser and an LD excitation solid-state laser.

20. The laser light generating apparatus according to claim 1, wherein one of the first resonator and the second resonator maintains a resonance by one of a FM sideband method and a polarization method using the optical path length adjusting means.

21. The laser light generating apparatus according to claim 1, wherein the first wavelength lies between 250 nm and 275 nm inclusive, the second wavelength lies between 650 nm and 785 nm inclusive, and the third wavelength lies between 180 nm and 204 nm inclusive.

22. The laser light generating apparatus according to claim 1, wherein the wavelength of the laser light with the third wavelength is one of equal to and less than 10 pm.

23. The laser light generating apparatus according to claim 22, wherein the wavelength of the laser light with the third wavelength is one of equal to and less than 1 pm.

24. The laser light generating apparatus according to claim 23, wherein the wavelength of the laser light with the third wavelength is one of equal to and less than 0.1 pm.

25. An optical apparatus comprising:
a first laser light generator for outputting laser light with a first wavelength;
a first resonator for resonating the laser light with the first wavelength;
a second laser light generator for outputting laser light with a second wavelength;
a second resonator arranged adjacent said first resonator for resonating the laser light with the second wavelength;
a laser light generating means comprising a nonlinear optical device included in the first resonator and the second resonator and having an incident surface and an exit surface at respective ends through which the laser light with the first wavelength and the laser light with the second wavelength enter and exit; and
the optical apparatus generates laser light with a third wavelength through sum-frequency mixing of the laser light with the first wavelength and the laser light with the second wavelength passing through the nonlinear optical device;
optical elements respectively arranged in the first and second resonators for setting a respective incidence of the laser light with the first wavelength and the laser light with the second wavelength relative to the incidence surface of the nonlinear optical device, so that the laser light with the first wavelength and the laser light with the second wavelength do no share an optical axis inside the nonlinear optical device, whereby
the laser light with the first wavelength and the laser light with the second wavelength have spatially-separated beam central axes and enter into the nonlinear optical device through the incident surface; and the laser light with the first wavelength, the laser light with the second wavelength, and the laser light with the third wavelength have spatially-seperated beam central axes, exit from the nonlinear optical device through the exit surface, and have different optical paths.

26. The optical apparatus according to claim 25, further comprising transmitting means for transmitting ultraviolet light supplied from a light source, where the transmitting means is made of optical fiber.

* * * * *